United States Patent [19]

Overbay

[11] Patent Number: 4,800,637
[45] Date of Patent: Jan. 31, 1989

[54] METHOD OF REMOVING PLUGS

[75] Inventor: Mark A. Overbay, East Ridge, Tenn.

[73] Assignee: Combustion Engineering, Inc., Windsor, Conn.

[21] Appl. No.: 129,572

[22] Filed: Dec. 7, 1987

[51] Int. Cl.[4] .............................................. B21D 53/02
[52] U.S. Cl. .................................. 29/157.4; 29/402.03; 29/426.4; 29/426.6; 29/727
[58] Field of Search .......... 29/400 N, 157 R, 157.3 R, 29/157.4 R, 402.03, 402.04, 426.4, 426.5, 426.6, 727; 165/71, 76; 138/89

[56] References Cited

U.S. PATENT DOCUMENTS

| | | | |
|---|---|---|---|
| 4,581,801 | 4/1986 | Kobuck et al. | 29/157.4 |
| 4,646,816 | 3/1987 | Rothstein | 29/157.4 |
| 4,679,315 | 7/1987 | Overbay | 29/426.5 |
| 4,696,102 | 9/1987 | Overbay | 29/402.03 |
| 4,734,972 | 4/1988 | Hawkins | 29/727 |
| 4,754,538 | 7/1988 | Stewart, Jr. et al. | 29/157.4 |

*Primary Examiner*—P. W. Echols
*Assistant Examiner*—Irene Cuda
*Attorney, Agent, or Firm*—John H. Mulholland

[57] ABSTRACT

A mechanical plug (20) having internal threads (24) and displaceable cone (30) for expanding the plug into secure engagement with a steam generator tube (14) is removed by a method which includes the step of moving the cone (30) upwardly within an internal cavity (22) along tapered surface (26), stretching the plug and thereby reducing its diameter by means of a tube stretcher 40 having an internally and externally threaded adapter (42), a bolt-like expander (50) and a force pad (52), and, pulling the plug from the tube.

7 Claims, 2 Drawing Sheets

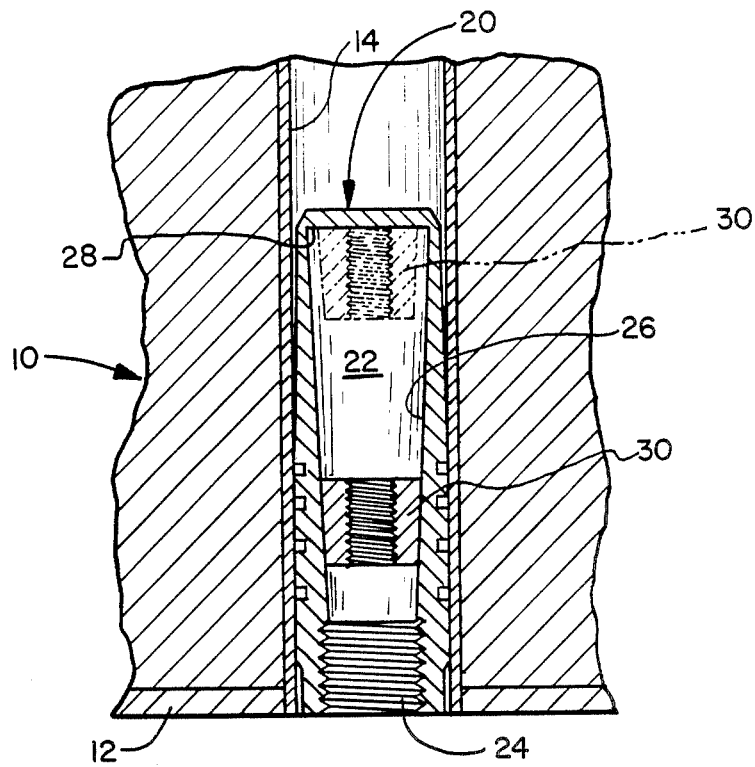
Fig. 1
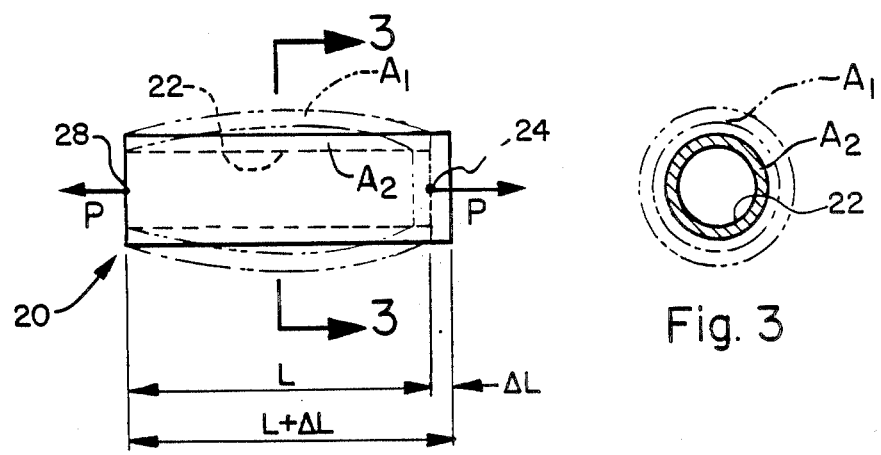
Fig. 2
Fig. 3

METHOD OF REMOVING PLUGS

BACKGROUND OF THE INVENTION

This invention relates to the subject matter of U.S. Patent Nos. 4,679,315 and 4,696,102, both of which have been patented by the inventor of the instant application and are assigned to the same assignee as the instant application.

As stated in those patents, tube and sheet heat exchangers, for example those used in a nuclear steam generator encounter problems in the form of tubes which become defective or damaged. In the past, these tubes were removed from operation by welding plugs into each end during a maintenance shutdown, and thereafter continuing the later operation of the steam generator with reduced capacity with the remaining tubes in operation. This form of maintenance is satisfactory until so many of the tubes are plugged as to make it economically unfeasible to continue operation at the reduced capacity. Thus, instead of doing the above, the tubes are presently plugged by plugs that can be removed at a later time. These plugs are mechanically expanded into the tubes without any welding being done. When too many tubes have been removed from operation, the unit is shut down, the plugs are removed and the tubes are inspected and tested to see which of the defective tubes can be effectively repaired, for example by sleeving. If enough tubes can be repaired, the useful life of the steam generator can be greatly extended. The plugs may be loosened by means of a tool which spirals an electrical arc along the inside surface of the plug wall. As the arc melts portion of its inner surface, the forces of solidification cause the wall of the plug to contract or shrink back, close to the original size that it was before it was expanded into the defective tube. A gripping mechanism is then used for pulling the plug from the tube end. Care must be taken during this action so as not to cause damage to the tubes. Another technique for removal of a plug of the type having internal threads involves merely attaching a pulling tool to the interior portion of the plug and pulling the plug from the tube. This frequently has created tube damage.

The internally threaded type of plug, typically, is Inconel of a first hardness and includes an interior cavity having a threaded portion and a displaceable cone of a second and greater hardness for movement downwardly along an internal tapered surface of the plug cavity to create a component of force which radially expands the softer plug and holds it in place in sealing engagement with an inner surface of a defective tube. Inconel is nominally 13% (by weight) chromium, 79.5% nickel and 6.5% iron. The displaceable cone is typically made of hardened "17-4 P.H." stainless steel. This material has a very low carbon content (0.07% max by weight) and is initially soft. Its other constituents are, typically, chromium (15.5-17.5%), nickel (3-5%), manganese (1% max.) and copper (3-5%). The alloy's ferritic structure permits hardening to 40 to 45 Rockwell "C" by a simple aging treatment at 900° F. to 1,150° F. The plug to be removed may be an Inconel "600 or "601" material having a typical yield strength of approximately 35,000 PSI. It is a softer than the "17-4 P.H.", generally being below 32 Rockwell "C".

SUMMARY OF THE INVENTION

The instant invention is a method of removing a mechanical plug of the internally threaded type from a steam generator tube. The plug, typically, has a first hardness and includes an interior cavity having a threaded portion and a portion containing a displaceable cone of a second or greater hardness for movement downwardly along an internal tapered surface of the plug cavity to radially expand the softer plug to seal off the tube. The improved method of removal involves moving the displaceable cone out of its radially expanding position within the interior cavity of the plug, and applying a force to the plug lengthwise by means of a "tube stretcher", thereby to elongate the plug and reduce the plug diameter. The tube stretcher threadedly attaches to the internally threaded portion of the cavity and is torqued to advance the cone against the end of the plug to accomplish the elongation and radial reduction. An internally and externally threaded adapter preferably makes the attachment of the tube stretcher to the internally threaded portion. The adapter includes a surface for pulling engagement by a suitable mechanical puller.

BRIEF DESCRIPTION OF THE DRAWINGS

FIG. 1 is a fragmentary cross-sectional elevation view of an internally threaded plug in a steam generator tube with the displaced cone position shown by dotted lines;

FIG. 2 is a schematic view of the type of plug shown in FIG. 1 representing the original expanded threaded plug in dotted lines and representing the elongated and radially reduced plug in solids lines;

FIG. 3 is a cross-sectional view of the schematic view in FIG. 2 taken along the line 3—3;

DETAILED DESCRIPTION OF THE PREFERRED EMBODIMENT

Figure 4:
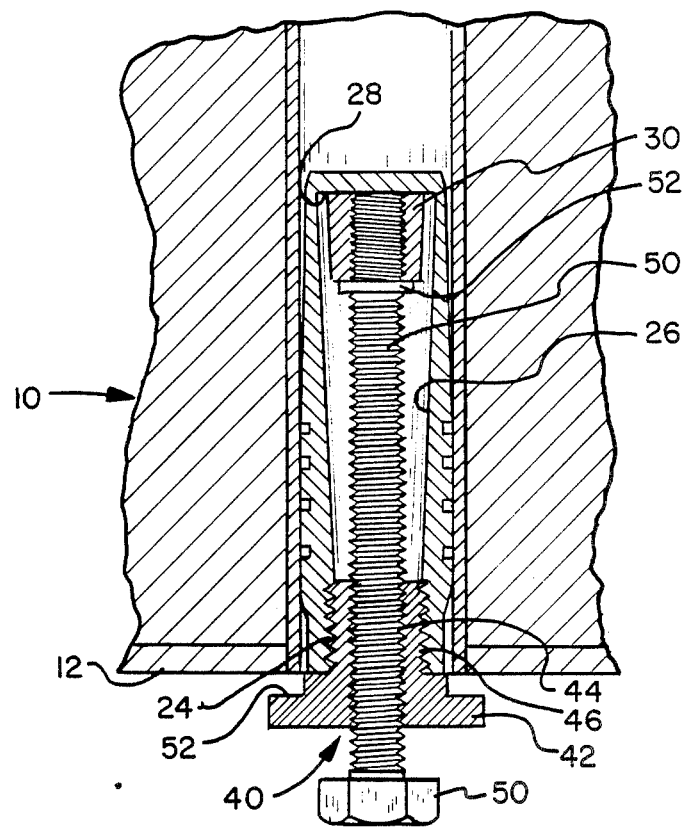
FIG. 4 is a view similar to FIG. 1 with the cone displaced and a tube stretcher in place for performance of the elongation step.

The numeral 10 generally designates a portion of a tubesheet of a steam generator which includes a clad surface 12 and an Inconel tube 14 in contact with the tubesheet. Within the tube 14 is an internally threaded plug generally designated by the numeral 20. The plug 20 is also of Inconel material and includes an interior cavity 22. The interior cavity 22 has an internal threaded portion 24 and a portion having a tapered surface 26. The tapered surface portion of the cavity contains a displaceable cone 30, of a material such as "17-4 P.H." stainless steel having a hardness of 40 to 45 Rockwell "C", which has been moved along the tapered surface to the position shown in full in FIG. 1 to create a component of force which radially expands the plug to a position schematically shown as $A_1$ in FIGS. 2 and 3. With the plug in this position, the steam generator tube 14 is withdrawn from service.

In the event tube 14 is desired to be placed back in service, the tube 14 is reopened by removal of the plug 20. This is accomplished by the displaceable cone 30 first being moved upwardly along tapered surface 26. A pneumatic hammer is convenient for this purpose. The cone 30 ends up in position as shown by dotted lines in FIG. 1.

In FIG. 4, the displaced cone 30 is at the top end 28 of the internal cavity portion 26 of plug 20 and is in position for elongation of the plug 20 by means of a plug stretcher generally designated by the numeral 40. The plug stretcher 40 includes a hollow adapter member 42 having internal threads 44 and external threads 46 for engagement with threaded portion 24 of plug 20. The adapter 42 is conveniently provided of Teledyne Vasco VASCOMAX 350, having a hardness of approximately 54 Rockwell "C".

The internal threads 44 provide driving engagement for a threaded bolt-like member 50 and end pad 52 for applying a force to the plug 20 lengthwise between the threaded portion 24 and the displaced cone 30 to reduce the plug diameter.

Once the plug 20 has been stretched and elongated, as shown schematically in FIG. 2, by the plug stretcher 40, a mechanical puller of any convenient type can be used to engage the flange surface 52 of the hollow adapter member 42 to pull the plug from the tube.

The act of pulling the plug from the tube is easy because of the reduced diameter of the elongated plug 20 after it has been stretched by the tube stretcher 40 between threaded portion 24 and the top end 28 of the plug 20. As seen in FIG. 2, the length of the plug changes from L to L+ΔL upon the application of force P. In one example, $\Delta L = \frac{1}{8}''$ and P is approximately 10,500 pounds of force. The cross-sectional area of the plug material before elongation is $A_1$ and after elongation is $A_2$. The reduction in diameter is characterized by the equation, $$\Delta L = PL/A_1 E$$

which states the change in length L is equal to the force, 10,5000 pounds in this example, times the original distance between the points of force application, 24 and 28, on the plug divided by the original cross-sectional area $A_1$, of the plug times the modulus of elasticity for the plug material. The load P is chosen as the load required to achieve plastic deformation as defined by:
$G_y = P/A_1$
 $P = G_y A_1$ where
 $G_y$—Max. yield strength of the Inconel material used.

A reduction in diameter occurs as the force is applied when stretching the plug 20 to its yield point due mainly to the conservation of mass. In the case of a typical internally threaded mechanical tube plug, only a few-thousandths of an inch reduction in diameter is required to substantially release the plug 20 for easy removal from the tube 14.

Figure 5:
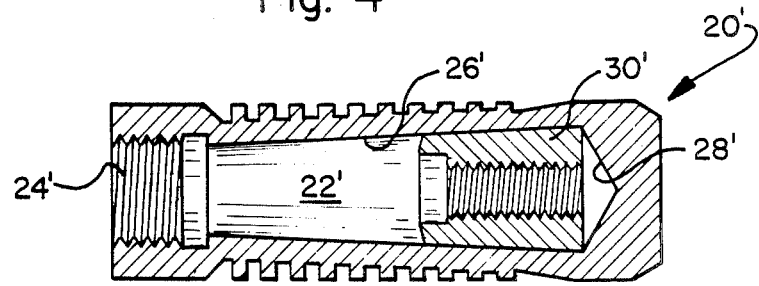
FIG. 5 is a view of an alternative internally threaded plug with a displaceable cone.

In FIG. 5, a typical commercially available internally threaded plug 20' is illustrated. As has been described, the tube stretcher 40 will easily elongate such a plug for removal from a steam generator tube. Like parts of the plug 20' have been labelled with numbers corresponding to the parts of plug 20, primed.

I claim:

1. In a method of removing an internally threaded plug for a steam generator tube, which plug has a first hardness and includes an interior cavity having a threaded portion and a portion containing a displaceable cone of a second and greater hardness for movement along an internal tapered surface of the plug cavity to create a component of force which radially expands the softer plug of a second lesser hardness and holds it in place in sealing engagement with an inner surface of a defective tube, the improvement comprising the steps of:
   moving the displaceable cone out of its radially expanding position within the interior cavity,
   applying a force to the plug lengthwise within the cavity to elongate the plug, and
   pulling the plug from the tube.

2. The method of removing the internally threaded plug of claim 1 in which the step of applying a force to the plug lengthwise within the cavity to elongate the plug reduces the plug diameter.

3. The method of claim 2 in which the step of applying a force to the plug lengthwise includes the step of applying a force between the threaded portion and the displaceable cone.

4. The method of claim 3 in which the step of applying a force between the threaded portion and the displaceable cone includes the step of installing an externally and internally threaded adapter in the threaded portion of the internal cavity.

5. The method of claim 4 in which the step of applying a force to the plug lengthwise includes the step of applying a force between the externally and internally threaded adapter and the displaceable cone.

6. The method of claim 5 in which the step of pulling the plug from the tube includes applying a force to the adapter.

7. The method of claim 5 in which the step of applying a force between the externally and internally threaded adapter and the displaceable cone includes torquing an elongated member with threads mating with the internal threads of the adapter to apply force from the elongated member against the cone and the cone against the interior surface of the cavity of the plug, thus elongating the plug.

* * * * *